United States Patent [19]
Dazy et al.

[11] Patent Number: 5,788,262
[45] Date of Patent: Aug. 4, 1998

[54] REAR SUSPENSION STRUT UPPER MOUNT

[75] Inventors: Michael A. Dazy, Ann Arbor; Paul McCormick, Troy; Mark F. Jacoby, West Bloomfield, all of Mich.

[73] Assignee: Chrysler Corporation, Auburn Hills, Mich.

[21] Appl. No.: 574,881

[22] Filed: Dec. 19, 1995

[51] Int. Cl.⁶ .................... B60G 15/07; F16F 9/54
[52] U.S. Cl. .................. 280/668; 267/220; 267/33; 267/293; 188/321.11
[58] Field of Search .................. 280/668, 673, 280/660, 662, 701, 697, 690, 696, 692, 691, 688; 267/220, 33, 292, 293, 141.2, 141.3, 141.4, 141.5; 188/321.11

[56] References Cited

U.S. PATENT DOCUMENTS

| | | | |
|---|---|---|---|
| 4,219,189 | 8/1980 | Scrivo et al. | 267/220 |
| 4,462,608 | 7/1984 | Lederman | 280/668 |
| 4,721,325 | 1/1988 | Mackovjak et al. | 280/668 |
| 4,958,849 | 9/1990 | Pinch et al. | 280/668 |
| 5,248,134 | 9/1993 | Ferguson et al. | 267/220 |
| 5,275,389 | 1/1994 | Pinch et al. | 267/220 |
| 5,308,048 | 5/1994 | Weaver et al. | 267/220 |
| 5,308,104 | 5/1994 | Charles | 280/668 |
| 5,454,585 | 10/1995 | Dronen et al. | 280/668 |
| 5,467,971 | 11/1995 | Hurtubise et al. | 280/668 |

*Primary Examiner*—Peter C. English
*Attorney, Agent, or Firm*—Thomas G. Pasternak

[57] ABSTRACT

An automotive suspension strut module has an upper mount assembly which includes a unitary plastic upper mount carrier formed with a through passage which is concentrically disposed about the strut principal axis. The passage is formed with a recessed pocket terminating in an internal annular shoulder, on which is seated a composite strut rod isolator having a metal rod connector cup embedded therein. The rod threaded upper end, which is positioned through a cup bottom wall aperture for threaded attachment by a nut, has its isolator annulus bonded to the connector cup by virtue of the side wall of the connector cup being embedded in the annulus of the rod isolator, whereby the strut rod loads may be tuned independently of the suspension travel loads. An upper end of the plastic carrier is molded with a radially outward flange, defining a circular undersurface seat for an upper end of the suspension helical spring, thereby providing a compact light weight strut upper mount assembly that is readily mounted to the vehicle body structure.

9 Claims, 4 Drawing Sheets

REAR SUSPENSION STRUT UPPER MOUNT

FIELD OF THE INVENTION

This invention relates to vehicle suspension strut modules and, more particularly, to an upper body mount for a rear suspension strut module.

BACKGROUND OF THE INVENTION

It is common in vehicle suspension strut module upper body mounts to provide dual path isolation systems that separate strut damper rod loads from suspension travel loads. In such systems the module upper body mount typically includes an elastomeric strut damper rod isolator, having a mold bonded inner metal strut rod connection, which is subsequently bonded into a mount bore. This allows the strut rod isolator, which dampens only those forces transmitted due to force/velocity characteristics of the rod, to be tuned independently of the suspension strut module travel loads. As a result, all other road wheel suspension travel loads are transmitted either directly from the module helical coil spring, via an upper spring seat isolator, through the upper mount to the vehicle body; or from the damper cylinder upper striker plate, through a module jounce bumper and the upper mount, to the vehicle body. The upper mounts for such prior dual path systems require an expensive composite fabrication operation, wherein an elastomeric isolator must be molded with a plurality of stamped sheet metal members.

SUMMARY OF THE INVENTION

It is a feature of the present invention to provide a structural plastic upper mount carrier for a vehicle suspension strut module, which is simpler to construct and assemble while achieving an extended module service life.

It is another feature of the present invention to provide a structural plastic annular-shaped upper mount carrier formed with a through passage concentrically disposed about the strut axis. The carrier passage includes a recessed pocket for supporting an inner composite strut rod isolating connector, while the carrier outer periphery is formed with an integral flange for supporting a helical suspension spring upper end, thereby achieving a dual path isolation strut mount assembly with fewer components and reduced weight.

It is yet another feature of the present invention to provide a suspension strut upper mount assembly wherein the structural plastic mount carrier through passage, terminating in a lower outlet opening defined by a flanged shoulder, is adapted for supporting an upper deformable attaching collar integrally formed on an upper end of a strut rod jounce bumper.

It is a further feature of the present invention to provide a suspension strut upper mount assembly wherein the structural plastic carrier spring seat support flange undersurface includes a plurality of spaced radial ribs with the space between selected adjacent pairs of ribs defining block-like solid sections. Each of the solid sections is provided with a bore receiving a lower end of an upstanding threaded fastener bonded to the carrier, whereby each fastener upper end is adapted for extending through complementary openings in the vehicle body structure. Upon respective nuts being threaded on each fastener upper end, the carrier is adapted for readily securing the strut upper end to the body structure, thereby achieving a space-saving construction that is readily installed.

These and other features and advantages of the invention will be more fully understood from the following detailed description of the invention taken together with the accompanying drawings.

DETAILED DESCRIPTION OF THE INVENTION

Figure 1:
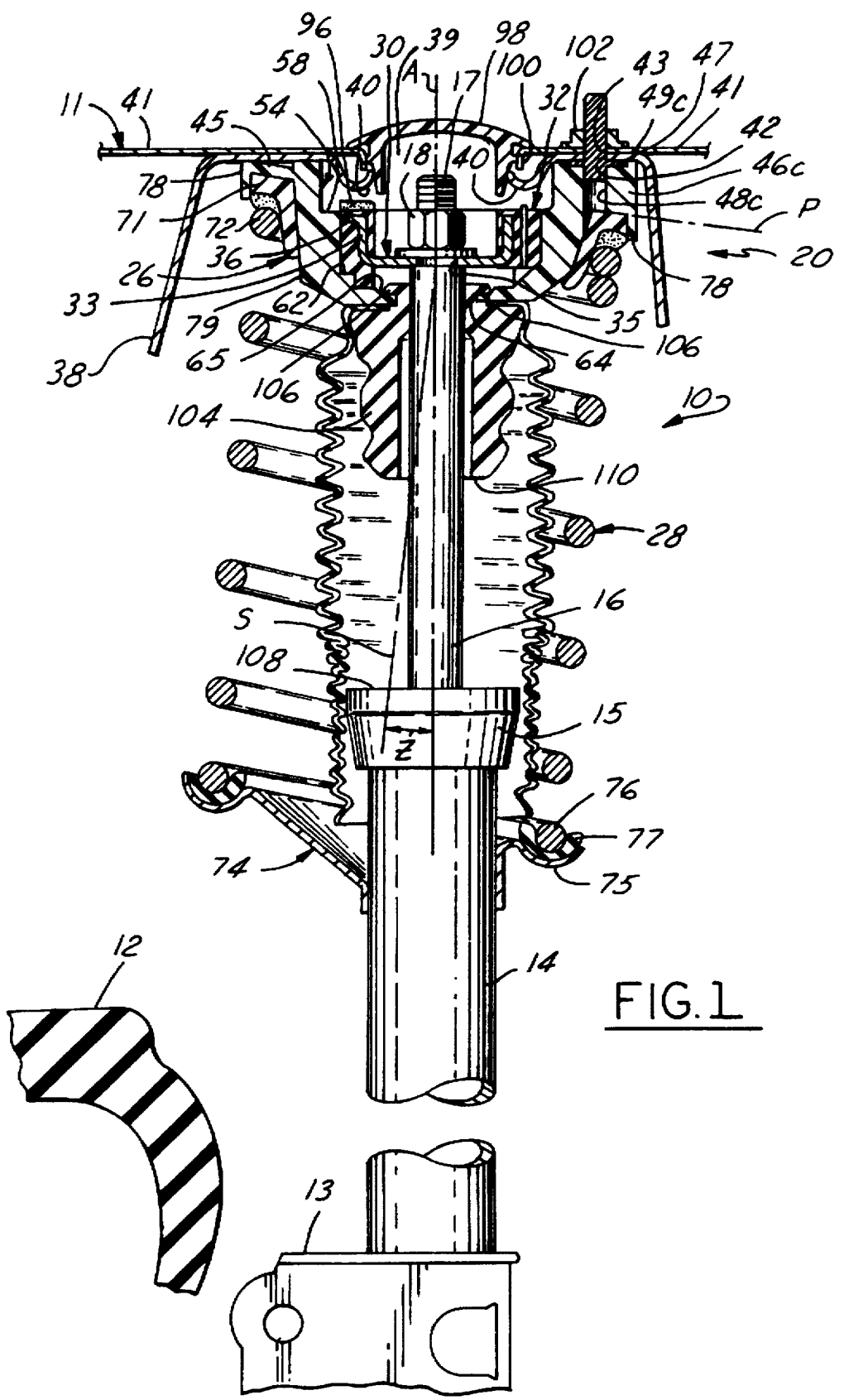
FIG. 1 is a fragmentary front view, partly in vertical cross section, of a suspension strut module incorporating an upper mount assembly of the present invention.
Figure 2:
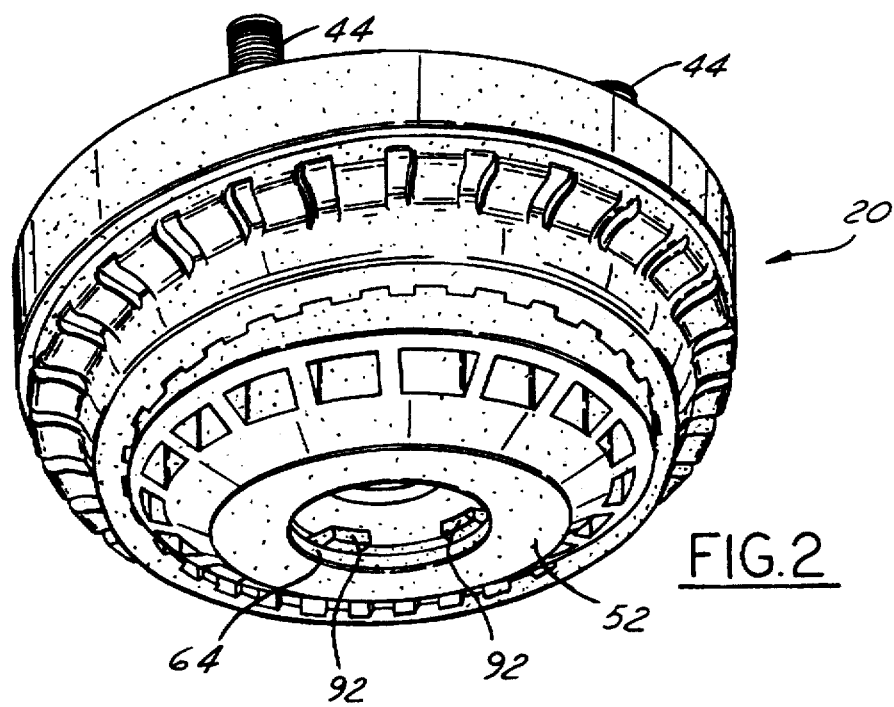
FIG. 2 is an enlarged perspective view of the FIG. 1 upper mount assembly.

Referring now to the drawings in detail, numeral 10 in FIG. 1 generally indicates a vehicle rear suspension strut module, including a hydraulic shock absorber strut damper, connecting a sprung mass body portion 11 with the vehicle's unsprung mass supported by a drive wheel 12. The suspension strut module 10 comprises a lower mounting bracket 13 adapted for connection to a rear wheel knuckle, not shown.

The mounting bracket 13 provides a lower connection for an outer cylindrical support tube 14 of the strut module 10, shown extending upwardly therefrom, with the tube lower end fixedly secured to the bracket 13. A strut support tube upper cap 15, mounted on the upper end of the tube 14, has an opening through which a strut damper rod 16 extends axially upwardly from a conventional valved piston, not shown, slidably mounted in an inner damper fluid reservoir tube, also not shown. The rod 16, adapted for reciprocal suspension movement along strut principal axis "A", has a reduced diameter threaded upper end 17 removably attached by hex nut 18 to an upper strut mount assembly, generally indicated at 20.

Figure 3:
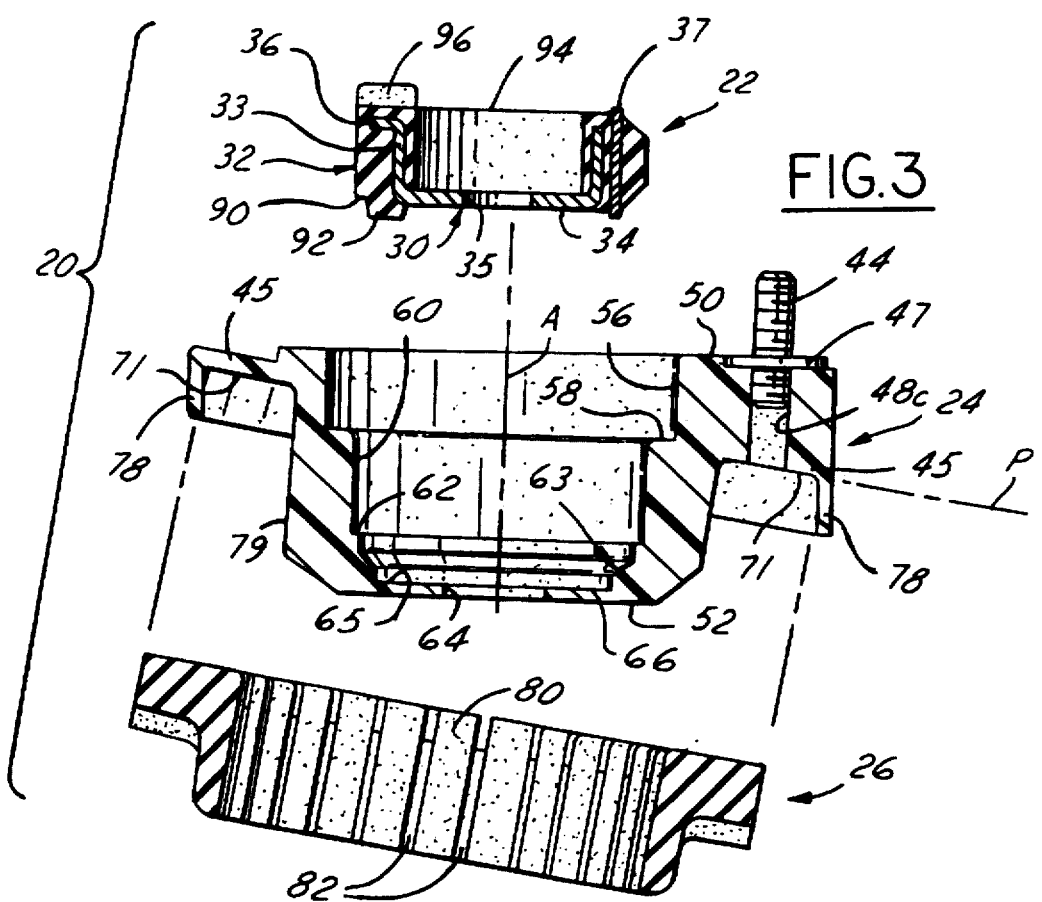
FIG. 3 is an exploded perspective view showing the three components of the FIG. 2 upper mount assembly.
Figure 4:
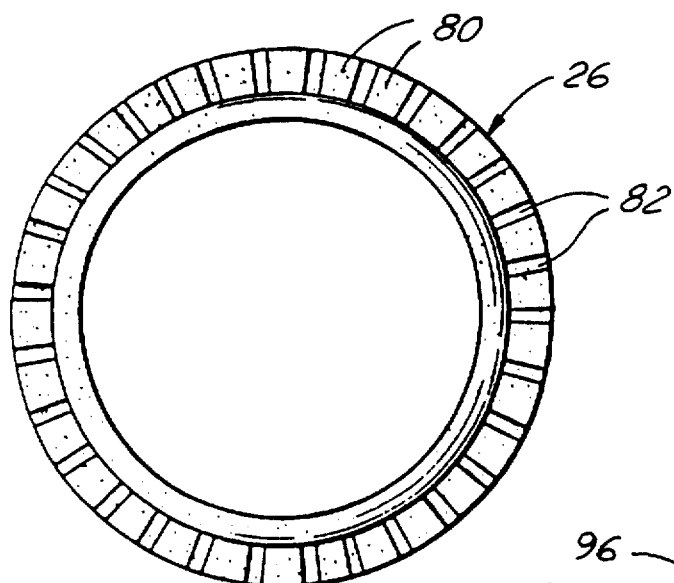
FIG. 4 is a detail bottom plan view of the suspension spring elastomeric isolator seat of FIG. 3.
Figure 5:
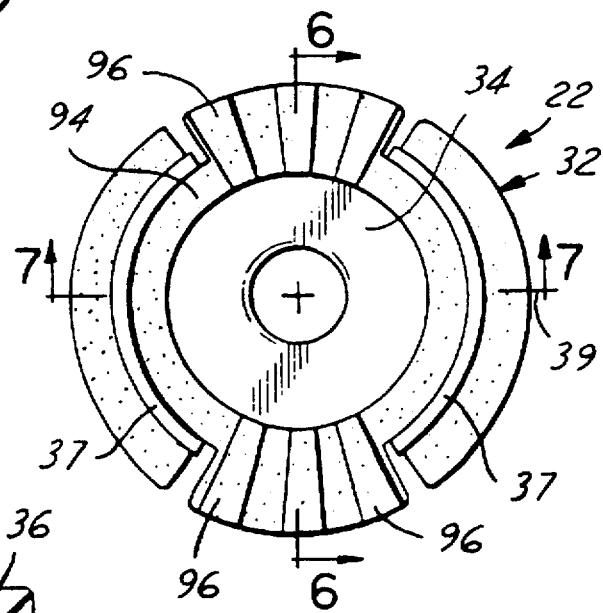
FIG. 5 is a detail top plan view of the composite strut rod isolator of FIG. 3.

As seen in FIG. 3, the strut mount assembly 20 includes a central composite bowl-shaped strut rod connecting isolator 22, an annular structural plastic carrier 24, and an upper elastomeric isolator ring 26 for a helical suspension spring 28. The composite rod isolator 22, shown in FIG. 1 concentrically supported about the strut axis "A", includes a cylindrical metal connector in the form of a metal cup 30, preferably stamped from sheet steel stock. The rod isolator 22 further includes an outer tubular-shaped annulus 32 of suitable elastomeric material, which in the disclosed embodiment is natural rubber.

The metal cup 30, preferably stamped from sheet steel, is formed with a cylindrical side wall 33, upstanding from a bottom wall 34. The rod isolator annulus 32 is mold bonded to the connector cup 30 by virtue of the connector side wall 33 being concentrically embedded in the annulus 32. Connector cup bottom wall 34 has a central hole 35, aligned on the axis "A", with the hole receiving the rod reduced end 17 for threaded attachment by the nut 18, shown in FIG. 1.

Figure 6:
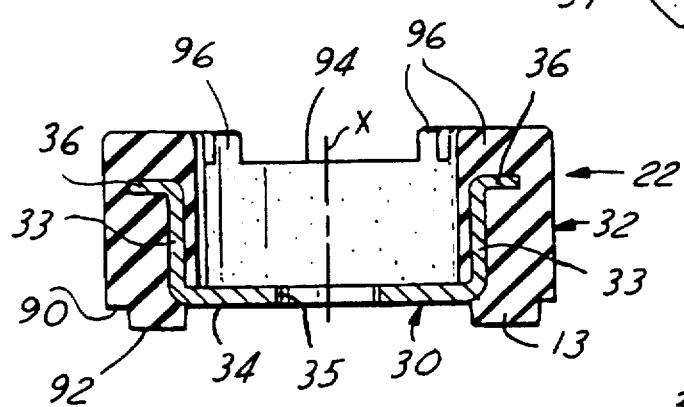
FIG. 6 is a vertical cross section taken on the transverse line 6—6 of FIG. 5.
Figure 7:
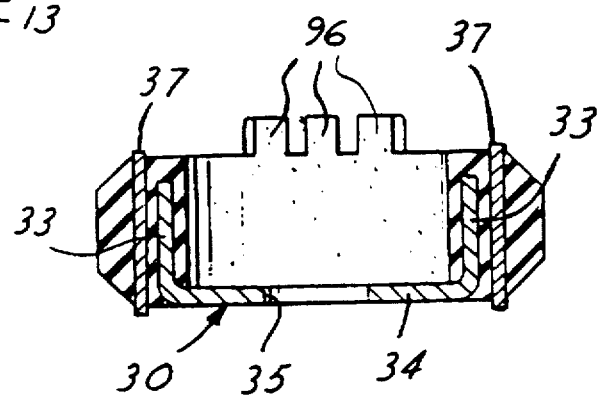
FIG. 7 is a vertical cross section taken on the longitudinal line 7—7 of FIG. 5.

With reference to FIG. 6, it will be seen that the metal cup side wall 33 terminates at its upper edge in opposed semi-circular, radially outward flange portions 36, symmetrically disposed about a first vehicle transverse axis, shown at "X" in FIG. 6. Referring to FIG. 7, it will be noted that a pair of opposed semi-circular metal rate plates 37 are shown symmetrically disposed about a second vehicle longitudinal axis "Y". The pair of rate plates 37 are operative to improve fore and aft or longitudinal stiffness of the strut rod elastomeric annulus 32.

A horizontal portion of the vehicle body rear sheet metal strut housing, shown at 38 in FIG. 1, is formed with an upwardly extending flanged access opening 39, surrounded by a depressed annular boss 40, aligned on the strut axis "A". The housing 38, which underlies a body upper cross member 41, has three fastener holes, only one of which is shown at 42. Each of the housing holes 42, together with an associated hole 43 in the upper cross member 41, are adapted to receive an associated carrier threaded stud 44.

Figure 10:
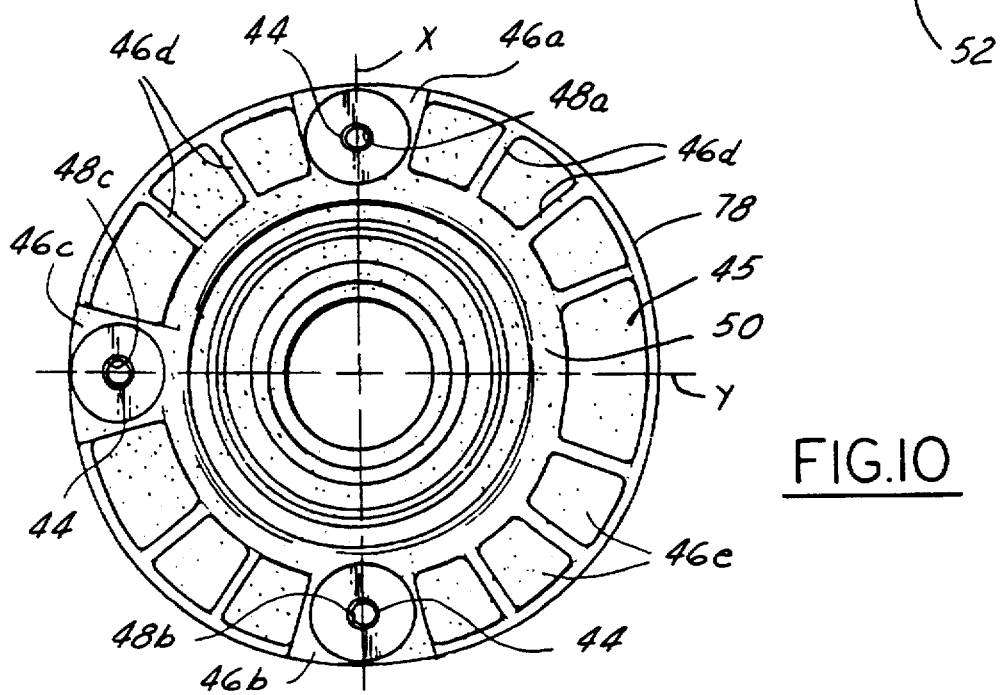
FIG. 10 is a top plan view of the plastic mount shown in FIGS. 3 and 9.

As seen in FIGS. 1 and 10, the upper portion of the carrier 24 is formed with a radially outwardly extending flange 45 molded with three flange block portions, 46a, 46b, and 46c. FIG. 10 shows an opposed pair of identical flange block portions 46a and 46b, aligned on the transverse axis x, while the remaining thickest block portion, shown at 46c, in FIG. 1, is aligned on the transverse axis y.

FIG. 10 depicts the upper surface of the carrier flange 45 formed with a plurality of spaced radial ribs 46d with spaces 46e, having varying sizes, established between adjacent ribs 46d. The areas between a selected plurality of pairs of ribs define the three molded-in block-like solid sections 46a, 46b, and 46c. The three solid sections 46a–46c each support an associated one of the vertically extending studs 44. As exemplified by the stud 44 in FIG. 3, each of the three studs 44, formed with an up-set washer 47, has one end molded in an associated one of the flange block through bores 48a–48c.

It will be noted that the mount carrier 24 is formed of a structural plastic material, which in the present embodiment is a molded in glass fibre reinforced nylon. Specifically the plastic material is a "Type 6" nylon, one-third filled with glass fibre, which is commercially available, for example, from BASF Corp., Plastics Materials Group, MI.

Figure 8:
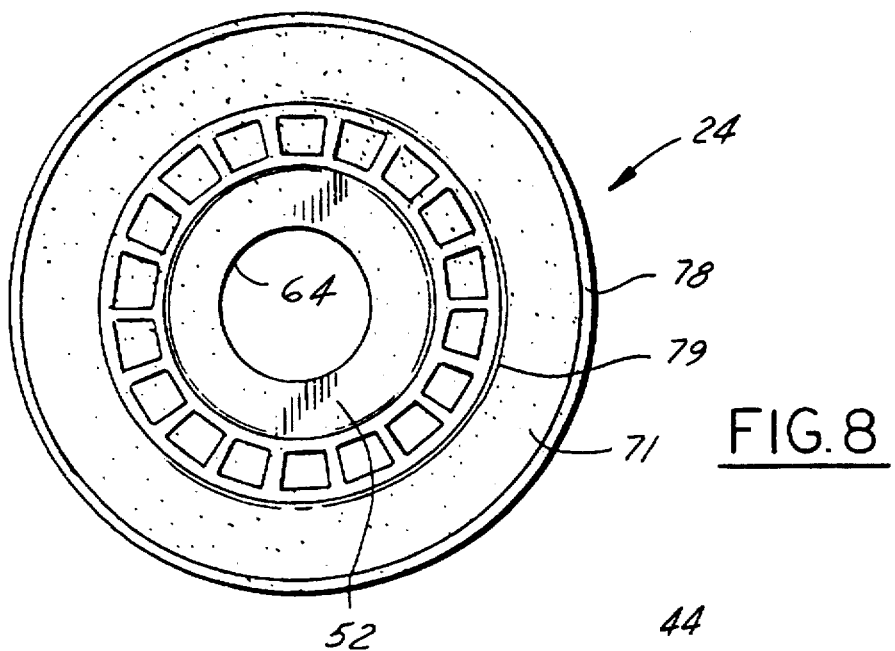
FIG. 8 is a detail bottom plan view of the plastic mount shown in FIG. 3.
Figure 9:
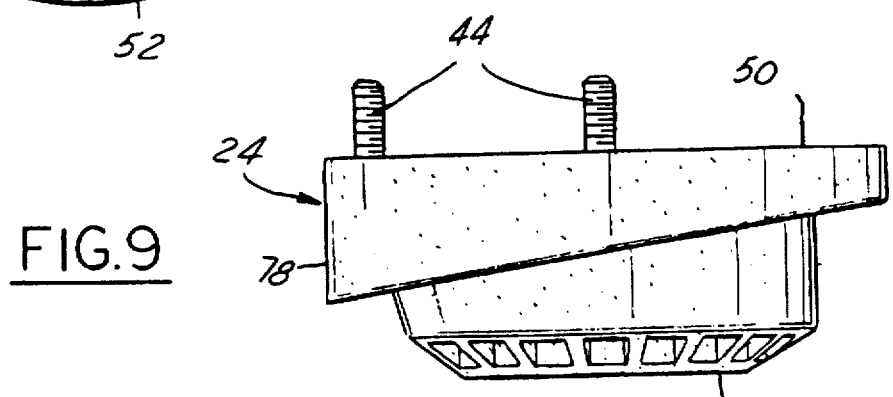
FIG. 9 is a side view of the plastic mount shown in FIG. 3.

With reference to FIGS. 8–10, the carrier 24 is defined in part by upper 50 and lower 52 parallel surfaces joined by a stepped through passage, generally indicated at 54, concentrically disposed about strut axis "A". FIG. 3 shows the passage 54 including an upper lead-in "counterbore" recess 56 terminating in a first upper annular shoulder 58, defining a subjacent intermediate pocket 60 adapted to receive, in a nested manner therein, the rod isolator, shown at 22 in FIG. 3. Pocket 60 lower terminus is defined by an intermediate annular shoulder 62. The passage lower inwardly stepped outlet 63, ends in a bottom flanged outlet opening 64 providing a lower shoulder 65, defined by annular flange 66.

In FIG. 3 the plastic carrier integrally molded radially outward extending flange 45 provides an upper annular undersurface spring seat 71 defining an imaginary plane that includes dashed construction line "P". As viewed in FIG. 1, the carrier upper spring seat flange 45 supports upper end coil 72 of a helical suspension spring, generally indicated at 28.

A lower helical coil spring bracket 74, welded to the strut outer tube 14, includes a lower, semicircular, spring seat 75 which supports lower end coil 76 of the spring on a lower elastomeric spring isolator 77. The lower spring seat 75 defines a plane which is substantially parallel to the plane of the upper spring seat 71. FIG. 1 shows principal axis "S" of the coil spring 28 oriented so as to define an acute angle "Z" of about 12 degrees relative to the strut axis "A".

Referring to FIG. 3, the spring seat flange 45 terminates at its radially outer periphery in a downstanding continuous fence 78, concentrically disposed about the strut axis "A". The fence 78, together with an opposed arcuate-shaped carrier side surface 79 and the seat undersurface 71, define an inverted U-section helical upper spring seat support. FIG. 1 shows the upper spring seat support sized for snug-fit retention therein of the spring upper elastomeric isolation ring 26.

It will be observed in FIG. 3 that the upper spring seat isolation ring 26, preferably formed of natural rubber, has its inner surface defined by a plurality of alternately spaced apart, longitudinally disposed L-section lugs 80 separated by intermediate grooves 82. The isolation ring grooves 82 provide gaped areas allowing the ring lugs 80 additional compression travel, whereby the ring absorbs increased lateral shear loads.

With reference to FIG. 6, the rod isolator annulus 32 has a lower peripheral surface 90 formed with a plurality of integral downstanding rebound lugs 92 adapted to contact carrier flanged shoulder 65, as seen in FIG. 1. The rod isolator annulus 32 includes an upper surface 94 formed with a plurality of integral upstanding jounce lugs 96 adapted to contact depressed annular boss 40 of sheet metal structure 38.

It will be further noted in FIG. 1 that a snap-fit vinyl cap 98 is provided which encloses the housing flanged access opening 39 and upper aligned opening 100 in the cross beam 41. The studs 44, upon being received through their associated cross beam holes 43 and aligned housing holes 42, are secured by respective hex nuts 102 threaded on each of the studs 44.

It will be observed in FIG. 1 that a generally cylindrical-shaped jounce bumper 104, made of elastomeric material such as rubber, has a top surface integrally formed with a resilient collar 106. The collar 106 has a predetermined formed diameter greater than the diameter of the carrier lower outlet opening 64. Thus, upon being deformed the collar is inserted through the carrier lower surface opening 64 for support of the jounce bumper collar 106 on the carrier lower shoulder 65. Lower end 110 of the jounce bumper 104 is adapted for contact with upper striker surface 108 of the strut tube cap 15.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. An upper mount assembly for operatively connecting a vehicle suspension strut module between sprung and unsprung masses of a vehicle body, the module having a strut damper tube provided with a piston rod adapted for reciprocal movement along a strut principal axis, and a helical spring supported between the tube and the body, the upper mount assembly comprising:

a one-piece plastic annular-shaped carrier defined by upper and lower generally parallel surfaces, said carrier being formed with a through passage concentrically disposed about the strut axis, wherein said passage has a recessed pocket terminating in an internal annular shoulder;

a composite strut damper rod isolator connector comprising a metal cup, defining a bottom wall formed with an upstanding side wall concentrically disposed about the axis, and an elastomeric isolator annulus with said cup side wall embedded in said annulus, wherein said rod isolator connector is secured in said pocket with a peripheral bottom edge of the isolator annulus seated on said annular shoulder; and said carrier comprising a radially outward extending flange defining an undersurface encircling said carrier, said flange terminating at its radially outer periphery in a downstanding fence which, together with an opposed carrier side surface and said flange undersurface, provides an inverted U-shaped upper spring seat support.

2. The vehicle suspension strut module upper mount assembly as set forth in claim 1 wherein said carrier flange is integrally formed with a plurality of radial ribs with a space between all but a remaining plurality of pairs of adjacent ribs, whereby at least two of the remaining plurality of pairs of adjacent ribs are each defined by a block solid section, each said solid section being provided with a bore receiving one end of an upstanding threaded fastener for molded-in retention therein.

3. The vehicle suspension strut module upper mount assembly as set forth in claim 1 wherein said flange undersurface defines an imaginary first plane which intersects the plane of said carrier upper surface at a predetermined acute angle, whereby said first plane is substantially parallel to a second imaginary plane which includes a lower spring seat support fixed on the strut tube.

4. The vehicle suspension strut module upper mount assembly as set forth in claim 1 wherein said inverted U-shaped spring seat support is snugly receiving therein an elastomeric isolation ring of rubber material upon which the helical spring upper end is adapted to seat.

5. The vehicle suspension strut module upper mount assembly as set forth in claim 4 wherein said elastomeric isolation ring of rubber material has an inner surface defined by a plurality of alternately spaced apart longitudinal lugs and longitudinal grooves.

6. The vehicle suspension strut module upper mount assembly as set forth in claim 1 wherein the strut rod isolator annulus has imbedded therein a pair of semi-circular rate plates symmetrically disposed in opposed relation about a vehicle longitudinal axis intersecting the strut axis, wherein the rate plates are concentrically disposed about the strut axis at a predetermined greater radial dimension than the radial dimension of said cup side wall from the strut axis.

7. The vehicle suspension strut module upper mount assembly as set forth in claim 1 wherein said carrier through passage is internally stepped defining a carrier upper surface recess terminating in a first recess shoulder, an intermediate pocket terminating in a second pocket shoulder, and a downwardly converging outlet cavity terminating in a third flanged shoulder bordering an outlet opening in said carrier lower surface.

8. The vehicle suspension strut module upper mount assembly as set forth in claim 7 wherein a generally cylindrical-shaped jounce bumper, made of a resilient elastomeric material, has a resilient collar integrally formed with a top surface of said jounce bumper, said collar has a diameter such that, in its un-deformed state, is greater than the diameter of said carrier outlet opening, whereby said collar is adapted for deformed passage through said carrier lower opening and thereafter expanding for retention on said third flanged shoulder.

9. The vehicle suspension strut module upper mount assembly as set forth in claim 1 wherein said one-piece carrier is formed from glass filled plastic material.

* * * * *